Nov. 27, 1951  J. W. GRAY  2,576,339
VARIABLE RATE SWEEP VOLTAGE GENERATOR
Filed April 3, 1945

A TRIGGER
B SWEEP CONTROLLED MULTIVIBRATOR NEGATIVE GATE
C OUTPUT SWEEP VOLTAGE
D SWEEP CONTROLLED MULTIVIBRATOR POSITIVE GATE
E DELAY MULTIVIBRATOR POSITIVE GATE
F COINCIDENCE TUBE CURRENT

INVENTOR:
JOHN W. GRAY
BY William D. Hall
ATTORNEY

Patented Nov. 27, 1951

2,576,339

UNITED STATES PATENT OFFICE 2,576,339

VARIABLE RATE SWEEP VOLTAGE GENERATOR

John W. Gray, Cambridge, Mass., assignor, by mesne assignments, to the United States of America as represented by the Secretary of War Application April 3, 1945, Serial No. 586,419

5 Claims. (Cl. 250—27)

My invention relates in general to electrical modifying circuits and more specifically to a circuit for producing an output voltage waveform which has a time rate of rise inversely proportional to an input voltage.

In the development of radiant energy systems for the determination of geometric locations of remote objects, it has become general practice to use indicating apparatus embodying the use of cathode ray tubes. Such an indicating means requires the use of some type of sweep circuit which deflects the electron beam within the cathode ray tube in such a manner as to provide a time base upon which the representation of remote objects may be presented, and thus data must be obtained as to the distance to the remote objects and also the azimuth in certain types of indicating means. Certain types of indication use a system of intensity modulation wherein the electron beam within the cathode ray tube is not dense enough to excite the indicating surface of the cathode ray tube to brilliance except when a representation of a remote object is received. Thus the representations of remote objects in this type of indication take the form of bright spots on the cathode ray tube screen. It has been found advantageous in certain applications of such indicating apparatus to have a sweep voltage of such a nature that the bright spot or presentation on the screen remains motionless with respect to the screen although the distance to the remote object is changing. Such a system is more fully described in the application of Britton Chance et al., Serial No. 586,420, filed April 3, 1945, and entitled "Communications Method."

In order to provide such a presentation as mentioned above, it is necessary to have a sweep voltage which has a time rate of change or rise inversely proportional to the distance or to a voltage which is directly proportional to the distance of the located object from the apparatus itself. Accordingly, it is one of the objects of my invention to provide a circuit wherein this is accomplished.

In general, my invention embodies a circuit wherein a rectangular voltage waveform of a time duration determined by an input voltage, which may be a voltage representation of the located object, is compared electronically to another rectangular voltage wave of a time duration determined by the rate of rise of a sawtooth voltage output waveform. The difference in the time duration of these two rectangular waveforms as determined by the electronic comparison means controls the magnitude of a charging potential in such a manner that the charging potential varies inversely as the magnitude of the input voltage. In turn, the charging potential determines directly the rate of rise of the output voltage waveform so that this rate of rise is also inversely proportional to the magnitude of the input voltage.

My invention will best be understood by reference to the appended drawings in which.

Figure 1:
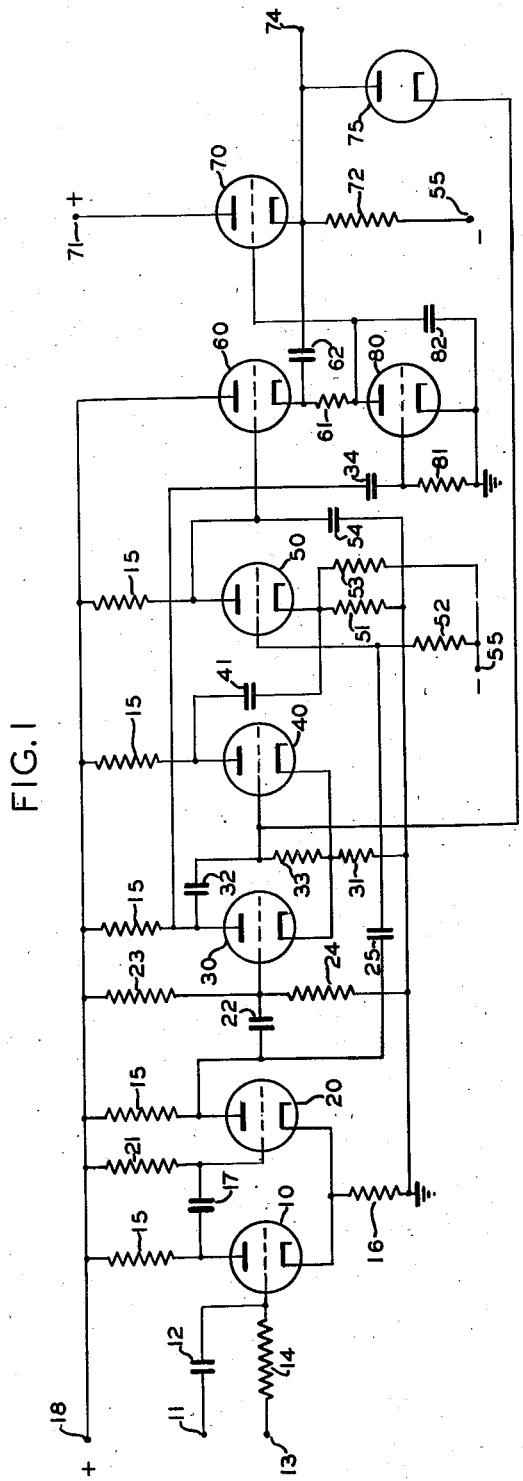
Fig. 1 shows a specific circuit embodying the principles of my invention.

The circuit shown in Fig. 1 embodies the use of a number of thermionic tubes, which are in this case triode vacuum tubes having anode, cathode and control electrodes, and are designated as follows: tubes 10 and 20 are in a delay multivibrator circuit; tubes 30 and 40 are in a sweep controlled multivibrator circuit; tube 50 is a coincidence tube; tubes 60 and 80 are in a sweep generating circuit; and tube 70 is in a cathode follower stage. Tube 75 is a diode. The plate load resistors designated as 15 are connected from the respective plates of tubes 10, 20, 30, 40 and 50 to a source 18 of positive D.-C. plate voltage.

The grid of tube 10 is connected to an input terminal 11 through a coupling capacitor 12 and to another input terminal 13 through a resistor 14. The cathodes of tubes 10 and 20 are connected together and then to ground through a common cathode resistor 16. The grid of tube 20 is connected to the plate of tube 10 through capacitor 17 and to the plate voltage supply 18 through resistor 21. Thus tubes 10 and 20 with their associated elements constitute a conventional delay type or triggered multivibrator.

The plate of tube 20 is connected to the grid of tube 30 through a coupling capacitor 22 and to the grid of tube 50 through capacitor 25. A constant positive D.-C. bias for the grid of tube 30 is provided by a voltage divider formed by resistors 23 and 24 connected from the plate voltage supply to ground, the junction between resistors 23 and 24 being connected to the grid of tube 30 to provide the voltage dividing action. The cathodes of tubes 30 and 40 are connected together and then to ground through a common cathode resistor 31. The plate of tube 30 is connected to the grid of tube 40 through capacitor 32 and to the grid of tube 80 through capacitor 34. The grid of tube 40 is connected to the cathode of tube 40 through a grid resistor 33, and it is also connected to the cathode of diode 75. Thus tubes 30 and 40 along with the necessary circuit elements form another triggered multivibrator circuit which is known in this particular circuit as the sweep controlled multivibrator.

The plate of tube 40 is connected through coupling capacitor 4 to the cathode of tube 50. The cathode of tube 50 is connected to ground through cathode resistor 51 and to a source of negative D.-C. voltage 55 through a resistor 53.

The grid of tube 50 is connected to the negative voltage source 55 through resistor 52. The plate of tube 50 is connected to ground through a capacitor 54 and is directly connected to the grid of tube 60.

The plate of tube 60 is directly connected to the plate voltage supply 18, and the cathode is connected to the plate of tube 80 through a resistor 61 and to the cathode of tube 70 through a coupling capacitor 62. The plate of tube 80 is connected to ground through a capacitor 82; the cathode is directly connected to ground; and the grid is connected to ground through resistor 81. The plate of tube 80 is also connected directly to the grid of tube 70. The cathode of tube 70 is connected through a cathode load resistor 72 to the source of negative D.-C. voltage 55. The plate of tube 70 is connected to another source of positive D.-C. voltage 71 which is of a somewhat greater magnitude than source 18. The cathode is also connected to the plate of diode 75 and to an output terminal 74.

In the operation of this circuit it is necessary to apply a timing or trigger pulse to input terminal 11 and a D.-C. voltage to terminal 13. In the specific application of this circuit mentioned previously, the trigger pulse is obtained from the associated radiant energy system, and the D.-C. voltage is also obtained from this source and is proportional to the distance from the radiant energy system to the remote object.

The operation of the delay multivibrator comprising tubes 10 and 20 is such that tube 10 is normally cut off until the aforementioned trigger pulse is applied which initiates a negative voltage gate at the plate of tube 10 of a time duration proportional to the aforementioned D.-C. voltage which is applied to the grid of tube 10 along with the trigger pulse. Simultaneously, a positive voltage gate of the same time duration is produced on the plate of tube 20 as a part of the conventional multivibrator action.

The sweep controlled multivibrator comprising tubes 30 and 40 is triggered by the positive voltage pulse from the plate of tube 20, the pulse being applied through coupling capacitor 22 to the grid of tube 30. This initiates a negative voltage wave on the plate of tube 30 and a positive voltage wave on the plate of tube 40. These rectangular voltage waves or gates have a time duration which is determined by the sweep voltage which is fed back to the grid of tube 40 in a manner which will be explained below.

The positive gate from tube 20 is applied to the grid of the coincidence tube 50 and the positive gate from tube 40 is applied to the cathode of the coincidence tube so that this tube is cut off as long as the two positive gates are both present. However, the gate from tube 40 of the sweep controlled multivibrator will have a shorter time duration determined by the sweep voltage fed back from the circuit output. This will produce a small time interval during which the grid voltage of tube 50 will be above the cut-off voltage so as to permit conduction of tube 50. Specifically, this time interval lasts from the termination of the positive gate from tube 40 until the termination of the positive gate from tube 20.

The coincidence tube has a capacitor 54 connected to its plate of such a value that along with its plate load resistor 15, which in this case has a large value of resistance, the charging time constant of 15 and 54 is large. When tube 50 conducts, 54 discharges through the tube at a rapid rate compared to the charging time. This means that the conduction time of tube 50 determines the potential at the plate of tube 50 during the time when tube 50 is cut off and 54 is recharging. In other words, if tube 50 conducts for a comparatively long period of time, capacitor 54 will have discharged to a comparatively low potential and therefore when tube 50 is again cut off, capacitor 54 will draw a heavy charging current through the plate load resistor 15 of tube 50 thus producing a comparatively low potential at the plate of tube 50 for the duration of the cycle.

The potential at the plate of tube 50 is applied directly to the grid of tube 60 which acts to all effects as a variable resistor. When the grid voltage is high, the resistance of the tube is low; when the grid voltage is low, the tube resistance is high. The effective resistance of this tube comprises, along with resistor 61, the charging resistance for capacitor 82 which is the sweep-producing circuit. A negative gate from tube 30 is applied to the grid of tube 80, holding it below cutoff while capacitor 82 charges. After the termination of the negative gate on the grid of tube 80, the tube conducts and allows capacitor 82 to discharge in preparation for another charging cycle. The sweep speed depends on the value of the effective resistance of tube 60 since the charging time constant depends on the value of this resistance plus the resistance of resistor 61.

The sweep voltage wave is applied directly from the plate of tube 80 to the grid of tube 70 in the cathode follower circuit. The cathode of tube 70 is coupled capacitively to the cathode of tube 60 to produce a better linearity in the sweep wave. This "boot strapping" works as follows: as the sweep-charging capacitor 82 charges exponentially, the output sweep wave is fed back from the cathode follower to increase the charging potential available to the capacitor 82. This tends to make the potential across the sweep capacitor 82 rise linearly instead of exponentially.

The output sweep wave is also fed back from the cathode of tube 70 through diode 75 to the grid of tube 40 to produce the sweep limiting of the gate produced by that tube. This functions by causing tube 40 to conduct when the sweep voltage reaches a certain value in its upward rise which is large enough to raise the grid of tube 40 above cutoff. The diode 75 is used as a coupling means since it allows application of the feedback voltage wave from the cathode follower but it prevents any change in the charging circuit of the coupling condenser between the grid of tube 40 and plate of tube 30. The output sweep voltage wave is taken from the cathode of tube 70.

As a summary, the brief overall operation of the circuit is as follows considering the case where the D.-C. input voltage to terminal 13 has decreased.

The D.-C. voltage to tube 10 decreases thus reducing the time duration of the gate produced by the delay multivibrator. This causes a smaller time of conduction for the coincidence tube 50 so that the voltage rises at the plate of tube 50, and tube 60 therefore has a reduced resistance. This reduces the charging time constant for capacitor 82 and gives a sweep speed which is larger than before. Thus a reduced D.-C. input voltage has caused an increased sweep speed giving an inverse proportionality.

Figure 2:
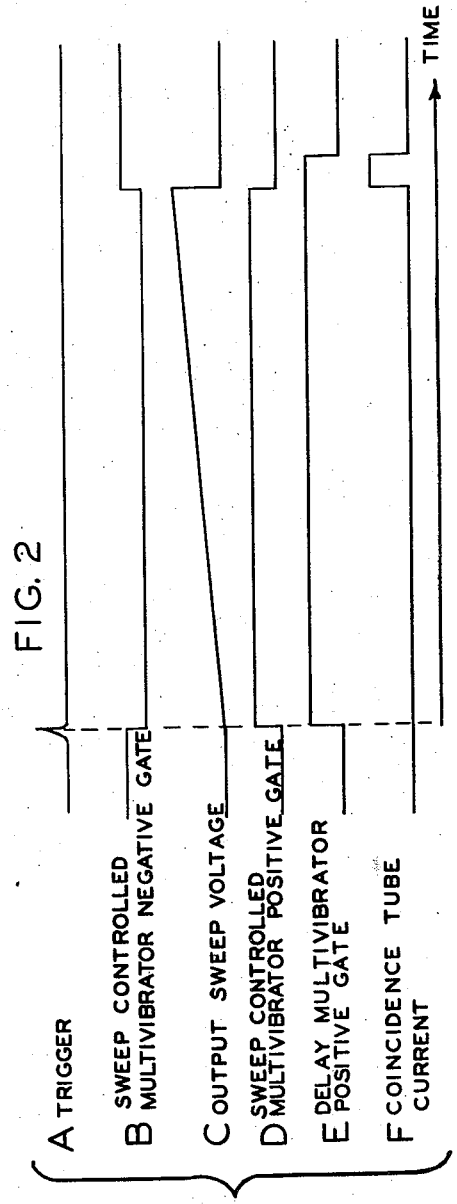
Fig. 2 shows voltage waveforms from various points in the circuit.

Fig. 2 is included to illustrate the relative time relationship between important waveforms in the circuit. For purposes of comparison the approximate waveforms are plotted one above the other in the same figure to the same time scale, but there is no particular relationship between the voltage magnitudes which are plotted in the vertical dimension since a comparison of the voltage magnitudes is unnecessary.

Waveform A is the trigger voltage applied to terminal 11. Waveform B is the negative gate appearing at the plate of tube 30 of the sweep controlled multivibrator. Waveform C is the output sweep voltage wave appearing at terminal 74. Waveform D is the positive gate appearing at the plate of tube 40 of the sweep controlled multivibrator. Waveform E is the positive gate appearing at the plate of the tube 20 of the delay multivibrator. Waveform F is the current waveform of the current flowing through the coincidence tube 50.

It is apparent to those skilled in the art that changes and modifications can be made in the specific circuit herein disclosed without departing from the spirit or scope of my invention, and I claim all such modifications as fall fairly within the spirit and scope of the hereinafter appended claims.

What I claim is:

1. In sweep voltage developing apparatus, a multivibrator circuit including a plurality of thermionic tubes, means for impressing onto said multivibrator a control voltage for determining the relative conducting time of each of the tubes in said multivibrator, a second multivibrator circuit, means for initiating the action of the second multivibrator circuit in accordance with the action of the first multivibrator circuit, a coincidence circuit, means for impressing electrical signals from both of the said multivibrator circuits upon the coincidence circuit whereby the coincidence circuit responds to the difference in time duration of the signals applied from said multivibrators, variable impedance means including a thermionic means, means for controlling the value of said impedance means in accordance with the response of the coincidence circuit, energy storage means, means for controlling the rate of storage of energy in said energy storage means in accordance with the value of said impedance means, and means for impressing a portion of the energy stored in said energy storage means onto the second of said multivibrator circuits to control the relative times of operation of the thermionic means therein.

2. Apparatus in accordance with claim 1 wherein the rate of rise of the value of energy stored in said energy storage means varies inversely with the value of the control voltage impressed onto the first multivibrator circuit.

3. Apparatus in accordance with claim 1 wherein the rate of rise of the value of energy stored in said energy storage means varies inversely with the value of the control voltage impressed onto the first multivibrator circuit, and wherein the means for storing energy of the energy storage means comprises a sweep charging capacitor, a thermionic discharge means for discharging at least a portion of the energy stored in said electrical energy storage means, means for controlling the action of said thermionic discharge means in accordance with the action of the said second multivibrator circuit, and a cathode follower circuit coupled to said sweep charging capacitor to derive an output therefrom.

4. A sweep voltage developing apparatus comprising means to generate a control pulse, means to generate a delay pulse in synchronism with said control pulse and having a duration determined by said control pulse duration, means to generate negative and positive gates in synchronism with said control pulse, a first energy storage means, variable impedance means through which energy to said first storage means passes to determine the rate of energy storage, a normally open discharge path substantially in parallel with said energy storage means to impress said negative gate upon said discharge path to close said normally open discharge path whereby energy is stored in said first storage means, means to feed back a portion of said stored energy to said negative and positive gate generating means to terminate said negative and positive gates at a predetermined level of said stored energy, a second energy storage means, a resistance through which charging energy to said second energy storage means passes, a normally closed discharge path substantially in parallel with said second energy storage means, means to compare said delay pulse duration with said positive gate duration, means to open said normally closed discharge path for the period of the difference of the durations of said pulses whereby the residual energy level and the potential across said second energy storage means is determined, and mans to impress the potential across said second energy storage means upon said variable impedance to control said impedance value, whereby the rate of energy storage in said first storage means is varied in accordance with the difference between the duration of said control pulse and the duration of said positive and negative gates.

5. In combination with a sweep voltage generator having a source of charging potential, a first condenser, a vacuum tube through which said first condenser is charged from said source of potential, and normally unblocked means to discharge said first condenser; a means for varying the rate of charge of said first condenser of said sweep voltage generator in accordance with the difference between the durations of two pulses comprising a second condenser, a resistor through which said source of potential charges said second condenser, normally blocked means to discharge said second condenser at a substantially constant rate, means to apply the one of said two pulses having the shorter duration to block said normally unblocked means, means to compare the two pulse durations of said sweep voltage generator, means to unblock said normally blocked means for the difference in duration of said two pulses, whereby said second condenser discharges to a potential level dependent upon said difference in pulse durations, and means to impress said second condenser potential level upon said vacuum tube of said sweep voltage generator to vary the current flow through said vacuum tube in accordance with said potential level, whereby the rate of charge on said first condenser varies as the difference in duration of said two pulses.

JOHN W. GRAY.

REFERENCES CITED

The following references are of record in the file of this patent:

UNITED STATES PATENTS

| Number | Name | Date |
|---|---|---|
| 2,075,140 | Schlesinger | Mar. 30, 1937 |
| 2,266,516 | Russell | Dec. 16, 1941 |